US009485361B1

United States Patent
McConkey et al.

(10) Patent No.: US 9,485,361 B1
(45) Date of Patent: *Nov. 1, 2016

(54) INTERNET SIP REGISTRATION/PROXY SERVICE FOR AUDIO CONFERENCING

(71) Applicant: West Corporation, Omaha, NE (US)

(72) Inventors: Paul McConkey, Toronto, CA (US); Myron P. Sojka, Logan, IA (US); John Falk, Parker, CO (US); Mark Jarzynka, Omaha, NE (US); Srinivas Maganti, Vijayawada (IN)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/854,262

(22) Filed: Sep. 15, 2015

Related U.S. Application Data

(63) Continuation of application No. 13/402,506, filed on Feb. 22, 2012, now Pat. No. 9,137,028.

(51) Int. Cl.
| | |
|---|---|
| *H04M 3/56* | (2006.01) |
| *H04L 12/18* | (2006.01) |
| *H04L 29/12* | (2006.01) |
| *H04L 29/06* | (2006.01) |
| *H04L 12/803* | (2013.01) |

(52) U.S. Cl.
CPC ............ *H04M 3/56* (2013.01); *H04L 12/1813* (2013.01); *H04L 47/125* (2013.01); *H04L 61/1511* (2013.01); *H04L 65/105* (2013.01); *H04L 65/1006* (2013.01)

(58) Field of Classification Search
None
See application file for complete search history.

(56) References Cited

U.S. PATENT DOCUMENTS

| | | | |
|---|---|---|---|
| 7,770,007 B2 | 8/2010 | Bobde et al. | |
| 7,872,994 B2 | 1/2011 | Garg | |
| 8,458,253 B1 | 6/2013 | Sojka et al. | |
| 2007/0106724 A1 | 5/2007 | Gorti | |
| 2007/0209067 A1 | 9/2007 | Fogel | |
| 2007/0217589 A1* | 9/2007 | Martin | H04M 3/56 379/202.01 |
| 2008/0151785 A1 | 6/2008 | Sylvain | |
| 2010/0220634 A1 | 9/2010 | Gisby | |
| 2010/0220845 A1 | 9/2010 | Oliver | |
| 2011/0191486 A1 | 8/2011 | Agrawal | |

* cited by examiner

*Primary Examiner* — Ian N Moore
*Assistant Examiner* — Latresa McCallum
(74) *Attorney, Agent, or Firm* — Raffi Gostanian

(57) ABSTRACT

To enable load balancing and the like for audio conferencing systems of an audio conferencing network, a DNS server may receive a DNS lookup from an internet softphone and return a prioritized list of audio conferencing system identities. The internet softphone may select an audio conferencing system and forward a SIP Invite to a Bridge interface layer of the respective audio conferencing system. If the SIP Invite does not generate a successful connection or generates a timeout, the internet softphone forwards the SIP Invite to the next prioritized Bridge interface layer in the list.

15 Claims, 6 Drawing Sheets

INTERNET SIP REGISTRATION/PROXY SERVICE FOR AUDIO CONFERENCING

CROSS-REFERENCE TO RELATED APPLICATIONS

This application is a continuation from U.S. patent application Ser. No. 13/402,506, filed Feb. 22, 2012, and entitled "INTERNET SIP REGISTRATION/PROXY SERVICE FOR AUDIO CONFERENCING", the entire contents of which is incorporated by reference herein in its entirety.

FIELD OF THE INVENTION

This disclosure relates to audio conferencing and in particular to systems and methods for providing audio conferencing to uses of software phones.

BACKGROUND OF THE INVENTION

There is a growing need to allow valid Internet softphone users to gain access to an audio conferencing bridge without compromising security (Encryption and Authentication), and without manually building SIP trunks for each user.

SUMMARY OF THE INVENTION

To enable load balancing and the like for audio conferencing systems of an audio conferencing network, a DNS server may receive a DNS lookup from an internet softphone and return a prioritized list of audio conferencing system identities. The internet softphone may select an audio conferencing system and forward a SIP Invite to a bridge interface layer, such as a Bridge interface layer, of the respective audio conferencing system. If the SIP Invite does not generate a successful connection or generates a timeout, the internet softphone forwards the SIP Invite to the next prioritized Bridge interface layer in the list.

In one aspect of the disclosure, there is provided an audio conferencing network comprising a plurality of audio conferencing systems, each audio conferencing system comprising an audio conferencing bridge and a Bridge interface layer. The network further comprises at least one internet softphone and a DNS Server. The DNS server may be configured to receive a DNS lookup request from the internet softphone and return a list of one or more of the audio conferencing systems. The at least one internet softphone is configured to receive the list of one or more of the audio conferencing systems and provide a SIP Invite to the Bridge interface layer of a first of the audio conferencing systems in the list.

In one aspect of the disclosure, there is provided a method for connecting an internet softphone to an audio conference. The method may comprise providing a DNS lookup request from the internet softphone to a DNS Server, receiving a list of one or more of the audio conferencing systems from the DNS server, and providing a SIP Invite to the Bridge interface layer of a first of the audio conferencing systems in the list.

In one aspect of the disclosure, there is provided non-transitory computer-readable storage medium comprising instructions for receiving a DNS lookup request in a DNS Server from an internet softphone, generating a list of audio conferencing systems based on the request, and providing the list to the internet softphone.

BRIEF DESCRIPTION OF THE DRAWINGS

Reference will now be made, by way of example only, to specific embodiments and to the accompanying drawings in which.

DETAILED DESCRIPTION OF THE INVENTION

As outlined broadly above, there is a requirement to allow Internet VoIP callers to gain access to audio conferencing platforms via secure, trusted means.

One option is to allow Internet VoIP users to register with a Bridge Interface Layer (such as a SIP server) associated with the audio conferencing bridge, and subsequently place calls to the audio conferencing bridge numbers using SIP. Validation of users may be handled by Authentication, rather than having to setup a SIP trunk for each end-point. In the following, there will be described a Bridge Interface Layer that can fulfill the registrar, proxy and authentication services required for allowing Internet VOIP users to participate in calls on an audio conferencing platform, in a secure, authenticated and encrypted manner.

Figure 1:
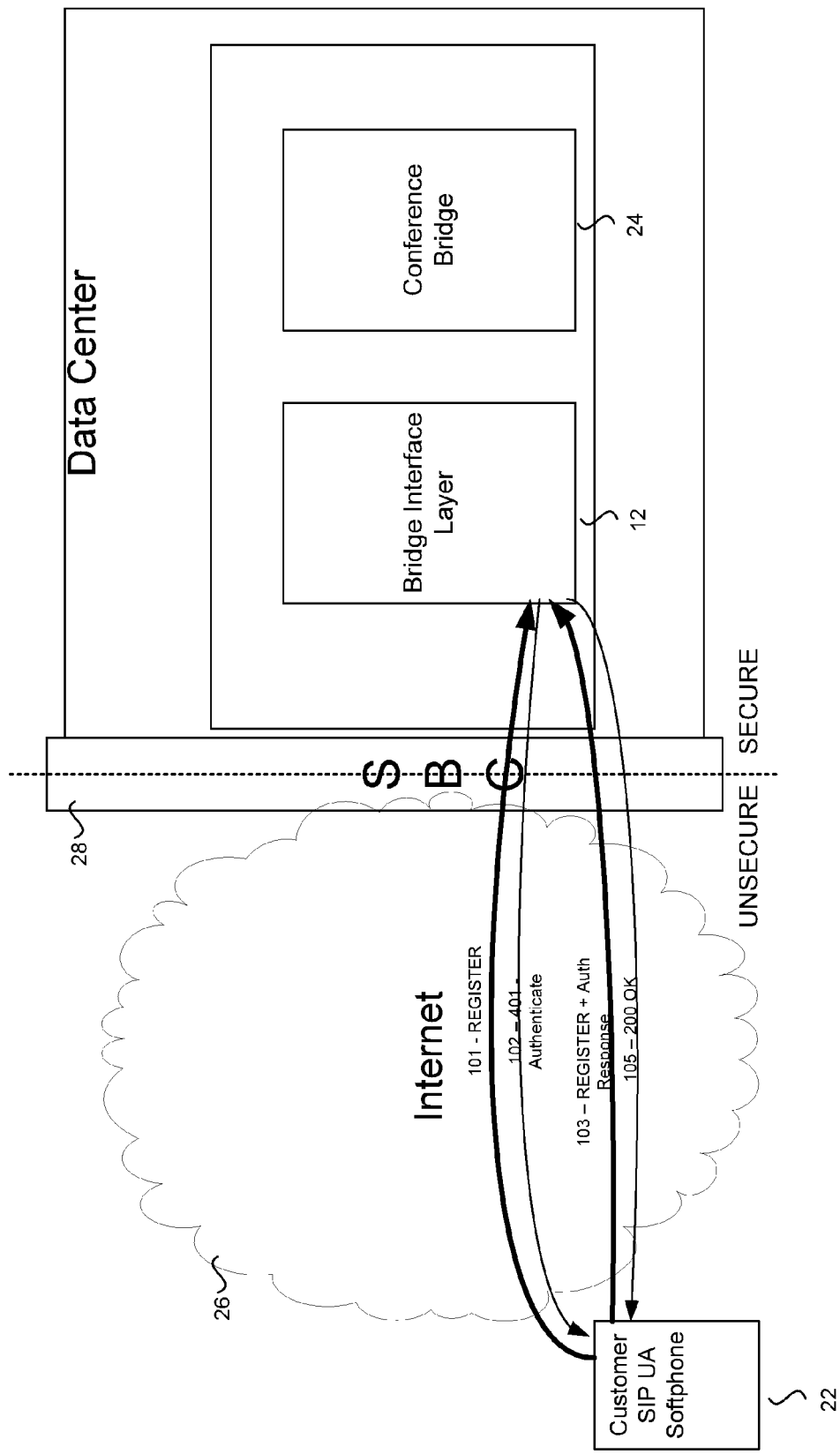
FIG. 1 shows SIP server and a SIP Register process.

In FIG. 1, there is a shown a system 10 including a Bridge Interface Layer 12. The Bridge Interface Layer 12 provides a proxy service, a location service and Registration service. An authentication database may be included in the Bridge Interface Layer or may be a separate system accessible from the Bridge Interface Layer.

The Bridge Interface Layer 12 processes inbound SIP REGISTER requests and stores location information (actual IP address of end-point) in a logical database. The Bridge Interface Layer is used in conjunction with Authentication (described below) to validate callers against a known database of users. The Registrar Service receives REGISTER requests from SIP UAs and updates its location service appropriately. Using the registrar function, the service provider can receive calls from any SIP UA 22 using a unique SIP-URI.

The Bridge Interface Layer 12 processes inbound SIP INVITE requests and routes calls to the appropriate end-point (such as an audio conferencing bridge or other registered end-points). The Bridge Interface Layer is also used in conjunction with Authentication (described below) to validate callers against a known database of users. The Bridge Interface Layer 12 routes SIP requests from a SIP UA 22 to the most appropriate endpoint based on its registrar database or other routing database. The Bridge Interface Layer 12 can also support SIP redirect features if needed, as will be described in greater detail below.

Authentication may be used to validate the identity of users (via username/password) that are making inbound SIP requests. The authentication processes, described in more detail below, can be used for multiple SIP request types e.g. REGISTER and INVITE. For encryption, a certificate authority (CA) may be used to sign SIP and RTP messages that traverse unsecure networks (Internet). Encrypted communications over the Internet (un-secure) is a must for SIP (TLS) and RTP (SRTP). Any man-in-the-middle attack could retrieve sensitive information if encryption is not used. By specifying authentication settings on REGISTER or INVITE requests, the service provider can limit & manage calls that pass through the SIP Server 12 to a known user base (username/password).

The Bridge Interface Layer 12 can be used to connect a customer SIP user agent softphone 22 to an audio conferencing bridge 24 via internet 26 and Session Border Controller (SBC) 28. The softphone 22 may be a softphone proprietary to the audio conferencing bridge 24 or may be a 3$^{rd}$ party softphone.

FIG. 1 shows a process for registering the customer. At step 101, an initial inbound REGISTER request is received by the Bridge Interface Layer 12 using a suitable IP Address or Domain Name. All SIP messaging is encrypted on the unsecure side of SBC (TLS) 28 and unencrypted on secure side of SBC 28. At step 102, the Bridge Interface Layer 12 returns a 401 Unauthorized response (or other suitable SIP response code), indicating authentication for REGISTER requests is required, and includes a challenge for authentication.

At step 103, the user re-sends REGISTER plus the authentication challenge response. In one embodiment, the challenge response may be an MD5 hash of various data including username and password. However, many different challenge/authentication methods will be apparent to a person skilled in the art and the specific authentication method is not pertinent to the present embodiments.

At step 104, the authentication response is validated via a transaction to the user DB to find username and password. If valid, the location information is stored in the Bridge Interface Layer 12. Step 105 is a reply to user with 200 OK indicating REGISTER request was accepted.

Figure 2:
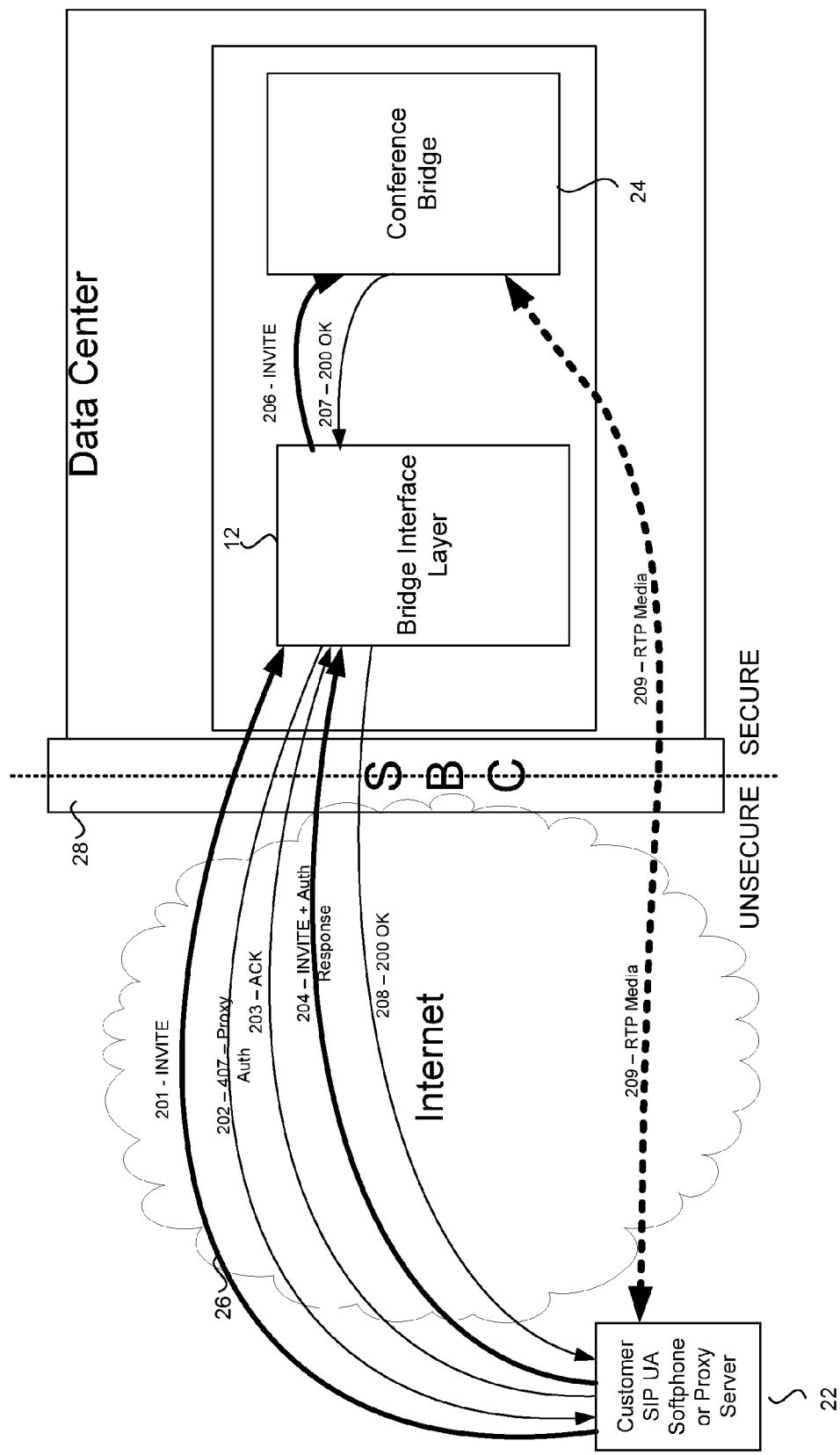
FIG. 2 shows a SIP Invite process.

In FIG. 2, there is shown an INVITE process on the system 10. At step 201, an initial inbound INVITE request is received by Bridge Interface Layer 12. As for the REGISTER process described above, all SIP messaging is encrypted on unsecure side of SBC (TLS) and unencrypted on secure side of SBC. At step 202, the Bridge Interface Layer 12 returns a 407 Proxy-Authentication Required response and includes a challenge for authentication (includes specifics for method of Authentication). At step 203, the customer UA 22 provides an ACK 407 response and then at step 204 the UA 22 re-sends INVITE plus the authentication challenge response, which in one embodiment may be an MD5 hash of various data including username and password.

At step 205, the authentication response is validated via a transaction to user DB 19 to find username and password, and if valid, route INVITE on to next hop. In the present case, at step 206, the call routes to an audio conference bridge locally, but could be to some other entity such as another registered user or to some other site. At step 207, the audio conference bridge 24 replies to the Bridge Interface Layer 12 with 200 OK indicating INVITE request was accepted. At step 208, the Bridge Interface Layer 12 replies to user 22 with 200 OK indicating INVITE request was accepted. At step 209, RTP Media is setup between user end-point 22 and audio conferencing bridge 24 (via SBC 28, but not Bridge Interface Layer 12. RTP may be encrypted on unsecure side of SBC (SRTP) 28 and unencrypted on secure side of SBC 28.

In one embodiment, internet softphone 22 may be configured to provide parameters of an audio conference in the SIP Invite. The Bridge Interface Layer 12 or the audio conferencing bridge 24 may be configured to extract these parameters from the SIP Invite, rather than through a DTMF prompts as would be typical for a standard telephone interaction.

In one embodiment, the parameters may be provided in one or more X-header fields of the transaction used to define the SIP Invite. For example, the internet softphone 22 may be configured to provide a passcode for an audio conference into an X-header field of the SIP INVITE transaction. The Bridge Interface Layer 12 or the audio conferencing bridge 24 may be configured to receive the SIP Invite and extract the passcode from the appropriate x-header field. If the passcode is valid, the internet softphone 22 can be validly connected to the audio conference, routed to another SIP endpoint or otherwise turned away. Sending the passcode as an X-Header as part of the SIP Invite means that the leader or participant does not need to manually enter the passcode using DTMF digits.

Other parameters of the audio conferencing set-up that may be provided in an X-header field may include, without limitation:

Is Host—An X-header to identify whether a person joining a call is a leader or participant.

Leader Pin—Sending the Leader Pin as an X-Header as part of the SIP Invite means that the Leader does not need to manually enter the Leader Pin using DTMF digits.

Security Code/Phone PAC—These two parameters may be sent as X-Headers in the SIP Invite to set the Security Code or Project Accounting Code for a call without needing to manually enter them via DTMF. A softphone based collection method is required to collect this information from the Leader (and participants in the case of Security Code). This collection mechanism can take the form of a keypad UI or some other text input UI provided as part of the internet softphone software.

Attendee ID—Sending a unique ID as an X-Header in the SIP Invite to allow synchronization between an audio conference and web based conference. Sending this in an X-Header means that the conference participant does not need to manually enter this information via DTMF.

For all these X-Header use cases, it is the softphone 22 which sends the X-Header and the Bridge Interface Layer 12 or the audio conference bridge 24 which interprets the X-Header. Other elements that may be between the softphone 22 and the Bridge Interface Layer 12 or audio conferencing bridge (typically a Session Border Controller) will transparently pass the SIP Invite with X-headers on unchanged.

As an alternative to providing the audio conference parameters in an x-header of the SIP Invite, one or more of the audio conference parameters may be provided in a URI.

Encryption may be required as part of SIP Registration and Proxy Service. The SBC 28 processes encryption verification on unsecure side, and allows for non-encrypted communication on secure side. Encryption may be applied to both SIP messaging (Secure SIP using TLS with Signed Certificates) and RTP Media (SRTP). SIP messaging may include both REGISTER events and INVITE call-flows. Each SBC open to Internet SIP traffic would need individual certificate, e.g. based on assigned IP and/or domain. SBC may handle the communication between Certificate Authority for gathering of public keys for inbound calls from encrypted sources.

The main reason for Proxy and Registration Authentication is to validate that an incoming call or register event is coming from a valid user of the proprietary audio conferencing services. That is, callers that are not valid users should be rejected. In general, calls received at the Bridge Interface Layer from an authorized SIP client will be valid. Calls from other stand-alone clients may be valid, but will need unique Authentication credentials to be established before the call is allowed to complete.

The authentication process may be approached in several ways. In one embodiment, it can be deemed necessary to know the individual identity of every caller that reaches the bridge network (i.e. an entry for each user). In an alternative embodiment, it may be sufficient to know that the caller is reaching the network using an approved SIP phone. In this case, i.e. where it is not necessary to know the identity of each caller it may be possible to use generic Authentication credentials that can be shared amongst multiple users.

Below are a few possibilities that could be used for the Authentication credentials when a SIP call attempts to reach the bridge platform.

In a first authentication embodiment, a random, unique username/password is created when the SIP client is installed on the end-user PC (i.e. customer softphone 22). This would not change but instead is hard-set per install. The end-user may be allowed to setup the username/password (part of install process), or the credentials could be generated randomly or logically by the service provider. Once generated, the credentials are loaded into the client as well as stored in the Authentication database. When the client connects (REGISTER or INVITE), a challenge is issued and the client returns hashed values for username/password, e.g. using the MD5 or Digest method. The user would not need to configure anything on their end, and auth entry would be hidden from user.

In a second authentication embodiment, a set of usernames/passwords may be created for each passcode provisioned in the audio conferencing database with IP calling privileges. Example—If trying to join a conference using passcode 123456789, the username/password for participant 1 may be 123456789/001. The Auth credentials would be dynamically allocated to client per call. This would require some connection back to the service provider to retrieve the username/password. When the client connects (REGISTER or INVITE), the authentication challenge is issued and with the client returning hashed values for username/password. The user would not need to configure anything on their end, and entry would be hidden from user.

In a third authentication embodiment, a random username/password may be assigned to each user as they attempt to join a conference from the SIP client. The Authentication credentials would be dynamically allocated to client per call. Like the methods above, this process may require a separate method such as a Call Control API (CCAPI) to retrieve the assigned username/password as the client initially attempts to connect. Dynamically assigning random username/password to the Authentication DB may require the service provider to de-register each end-point at the end of the call. In this embodiment, only active callers would have entries in the DB. A mechanism to remove valid auth entries once calls complete would be required.

If individual identity of each caller is not required, then in a fourth authentication embodiment, a single username/password combination can be created for each passcode provisioned in the audio conferencing bridge database with IP calling privileges. All callers to the passcode would use same username and password combination to connect. This would require some connection back to the service provider to retrieve the username/password.

In a fifth authentication embodiment, the same random username/password is assigned to all users as they attempt to join any conference from the SIP client. The username/password combination could be left static, or changed periodically based on security concerns. This process would require a method to retrieve the assigned username/password before or during the client's initial attempt to connect. However, a mechanism to change auth entry in auth proxy DB at regular intervals would be required.

When the Bridge Interface Layer or audio conferencing bridge receives the passcode of the conference that the client wishes to join, routing logic can be built so that the calls are routed to the correct site/SIP server. A separate method such as CCAPI will send DNIS and destination IP information to the client.

When a call participant wishes to join an audio conference, they initialize their installed SIP client. Initialization may be automated as part of a larger client, such as a WebEx or InterCall web client, or may be a standalone softphone. As part of that initialization a connection to CCAPI (or similar web service) is made to retrieve parameters relevant to the softphone, based on the passcode. CCAPI will return relevant parameters to the client including, but not limited to, the Authentication credentials, the SIP URI, codec selection, passcode, security code and account code settings. When the participant chooses to join a conference, the relevant parameters are mapped into SIP URI and custom SIP X-headers in a SIP Invite. Such parameters may include, but are not limited to, the conference passcode, participant role, web-conference synchronisation, Security code, account code. In general, conference information is passed from the softphone client to the Bridge Interface Layer and audio conferencing bridge via X-headers and without requiring user input, though this is not a strict requirement depending on the features enabled in a conference.

When a conference host wishes to join a conference, they initialize their installed SIP client. Initialization may be automated as part of a larger client, such as a WebEx or InterCall web client, or may be a standalone softphone. As part of that initialization, a connection to CCAPI (or similar web service) is made to retrieve parameters relevant to the softphone, based on the passcode. The CCAPI will return relevant parameters to the client including, but not limited to, Authentication credentials, the SIP URI, codec selection, passcode, Security code and Account code settings. When the host chooses to join a conference, the relevant parameters are mapped into SIP URI and custom SIP X-headers in a SIP Invite. Such parameters may include, but are not limited to, the conference passcode, participant role, leader PIN, web-conference synchronisation, Security code, account code. In general, conference information is passed from the softphone client to the InterCall conference bridge via X-headers and without requiring user input, though this is not a strict requirement depending on the features enabled in a conference.

CCAPI may also be used for in-conference control (mute, record, etc.) via the client, if desired.

The above described embodiments allow internet softphone users to register with a Bridge Interface Layer (where the Bridge Interface Layer can be defined as a server that can accept REGISTER and INVITE messages from Internet sourced IPs), and subsequently place call to audio conference bridge numbers using SIP. Calls may be encrypted on the Internet side (from end-user to the network edge/Session Border Controller (SBC)), and Authentication will be used to identify specific callers as they reach the network (performed within the Bridge Interface Layer).

Figure 3:
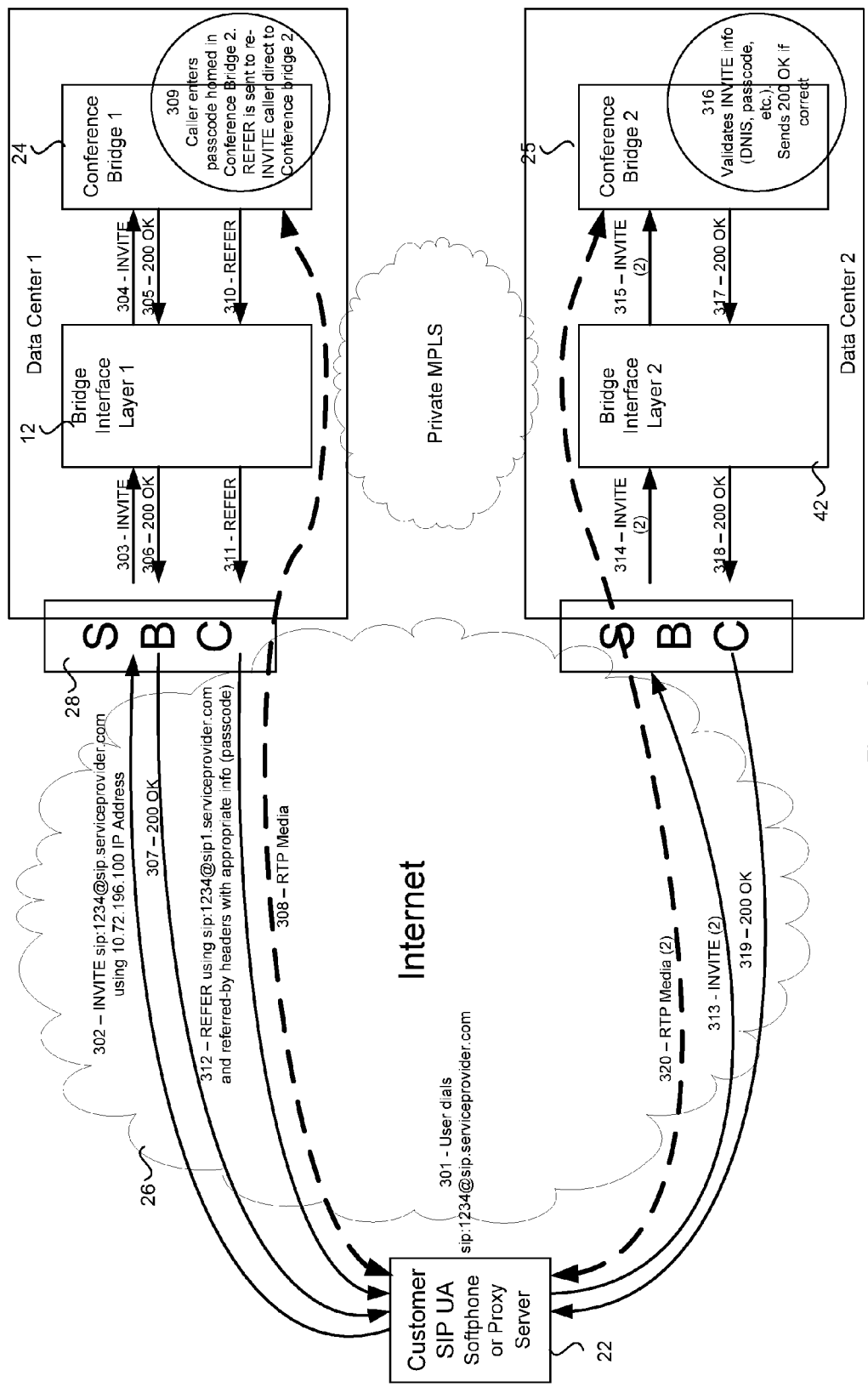
FIG. 3 shows a SIP Invite and Refer process.

An audio conference bridge that is configured to read parameters of an audio conference from a SIP Invite message may be used to facilitate other intelligent aspects of audio conference processing and call routing. In one embodiment, the audio conference bridge may be employed for referring misdirected calls from internet softphones. A system for REFER is depicted in FIG. 3.

In this case, at step 301, a user dials a number in the user interface of the internet softphone 22. In the present example, the dialed number is "1234". At step 302, a SIP Invite is passed from the internet softphone 22 through internet 26 and ultimately to the audio conferencing bridge 24 following the SIP Invite procedure described above (steps 303 to 307), thereby establishing an RTP media stream (step 308). Bridge 24 accepts the call and extracts the Passcode from the SIP Invite. Bridge is configured to process the Passcode and is able to determine that in this example, the passcode is homed on bridge 25 in Data Center 2 (step 309). The bridge 24 sends a REFER back to caller UA (steps 310 to 312) with referred-by header. The UA 22 is configured to accept the REFER and generate a new INVITE to the SBC for Data Center 2 (steps 313 to 315). The new INVITE may include the passcode in an x-header as described above. Bridge 25 accepts the new SIP Invite and (based on referred-by info) is able to place the caller into conference without having to re-prompt for passcode (step 316). 200-OK messages are returned to the caller (steps 317 to 319). RTP is torn down between the UA and the bridge 24 and re-established direct from UA to Bridge 25 (step 320)(no MPLS bandwidth used).

In addition to the enhanced functionality provided by the audio conferencing bridge, other aspects of the SIP system may be configured for enhanced audio conference bridge processing and call routing.

Figure 4:
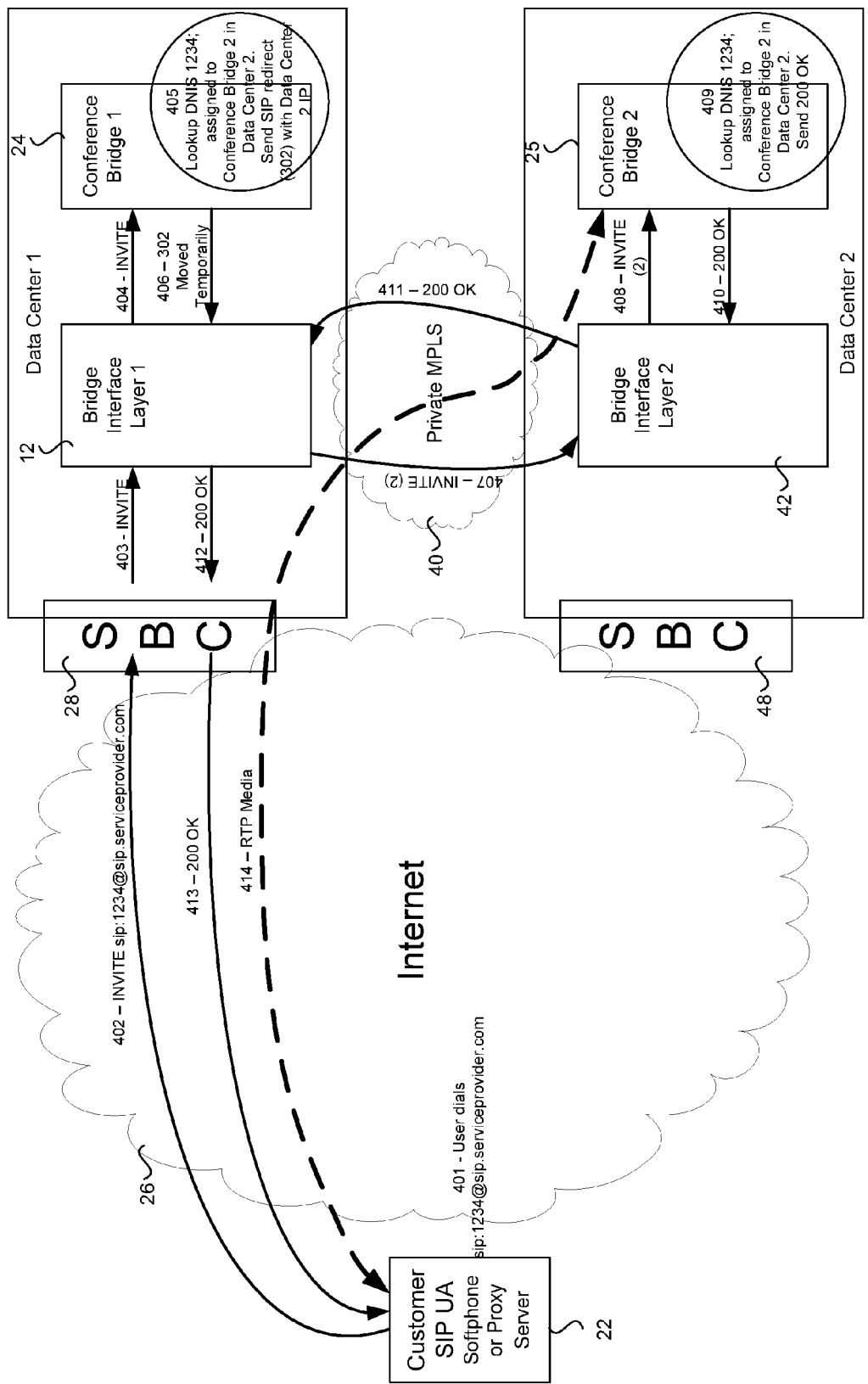
FIG. 4 shows a SIP Invite and 302 Redirect process.

FIG. 4 shows a distributed architecture and a process for redirecting SIP Invites based on Dialed Number Identification Service (DNIS). The process of sending the SIP Invite from the internet softphone to the audio conferencing bridge 24 (steps 401 to 404) are the same as for the process shown in FIG. 3. In this case, the dialed number (in To: SIP URI) is "1234". When bridge 24 does a lookup of the DNIS (step 405), it sees that the DNIS is assigned to bridge 26 in Data Center 2, and sends back a 302 message with sip2.intercall.com (10.28.162.100) in contact field (step 406). Some entity (in this case the Bridge Interface Layer 12 in Data Center 1) processes the 302 Redirect and sends INVITE to sip2.intercall.com with new contact info (step 407) via the Multiprotocol Label Switching (MPLS) backbone 40 and Bridge Interface Layer 42 in Data Center 2. Bridge 25 receives the SIP INVITE (step 408), and since the dialed number is assigned to bridge 25 (look up step 409), it sends a 200 OK message indicating call is accepted (step 410) which is returned to the internet softphone 22 via the Bridge Interface Layer 42 and Bridge Interface Layer 12.

RTP is setup between internet softphone 22 and audio conference bridge 25 through Data Center 1 SBC 28, then traverses MPLS backbone 40 to Data Center 2 audio conferencing bridge 25 (step 414). In an alternative embodiment, the 302 Redirect message may be returned all the way back to the calling UA (softphone or Proxy server) so that the INVITE could be sent direct to the redirected site (bridge 25) and then RTP is setup direct from UA to the new site (bridge25) via the SBC 48 of the new site.

One instance where a redirect may be required is where an audio conference has been moved, either temporarily or permanently, from one bridge to another for load balancing reasons.

Figure 5:
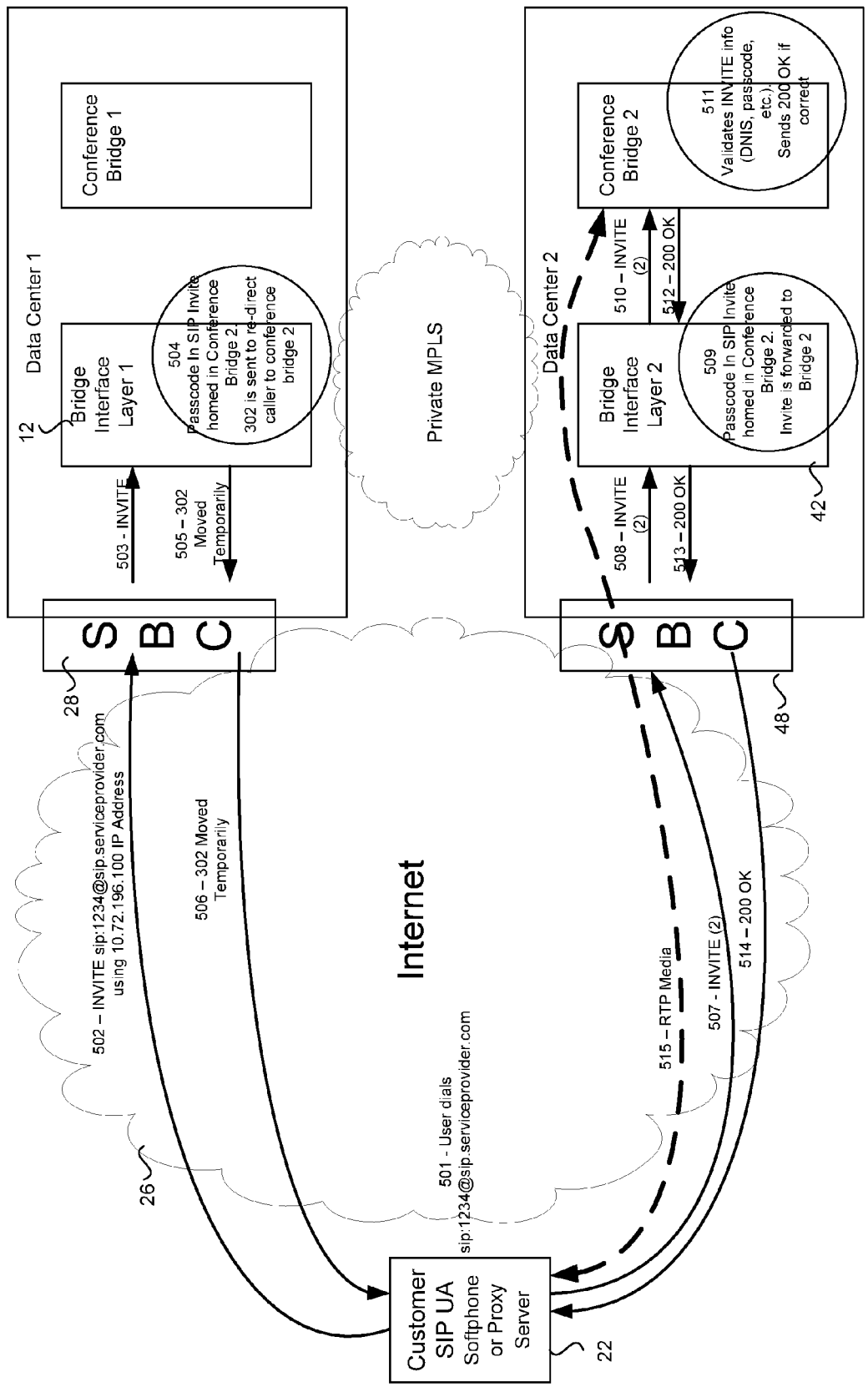
FIG. 5 shows an alternative SIP Invite and 302 Redirect process.

FIG. 5 shows an alternate distributed architecture. In this embodiment, the call routing is performed by the Bridge Interface Layer 12 and is based on information in the SIP Invite including X-headers. For example, the call routing decision may be based on the SIP URI, the passcode, or some other piece of information in the SIP Invite. The process of sending the SIP Invite from the internet softphone to the Bridge Interface Layer 12 (steps 501 to 503) is the same as for the process shown in FIG. 3. In this case, the dialed number (in To: SIP URI) is "1234". When the Bridge Interface Layer 12 does a lookup of the information contained in the SIP Invite (504) it sees that the conference should be hosted on audio conferencing bridge 25 in Data Center 2. The Bridge Interface Layer sends a 302 Redirect (506) to the UA 22 with the IP Address or DNS name of Data Center 2 SBC 48 in the Contact header. The UA 22 initiates a new SIP Invite to Data Center 2 (507-508) where Bridge Interface Layer 42 confirms that the call is destined for Bridge 25. Bridge 25 receives the SIP INVITE (step 510), and since the dialed number is assigned to bridge 25 (look up step 511), it sends a 200 OK message indicating call is accepted (step 512) which is returned to the internet softphone 22 via the Bridge Interface Layer 42.

RTP is setup between internet softphone 22 and audio conference bridge 25 through Data Center 2 SBC 48.

Figure 6:
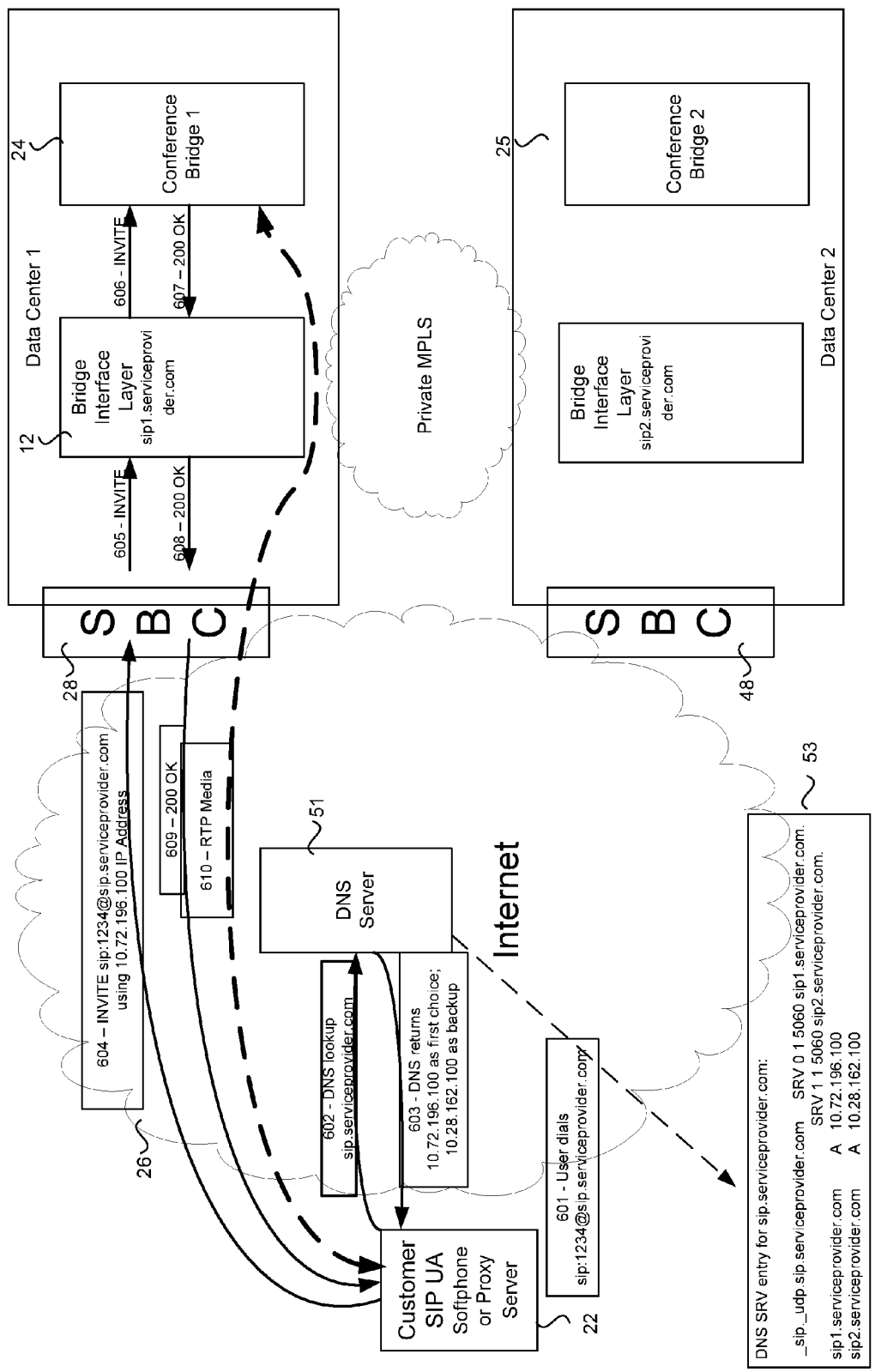
FIG. 6 shows a SIP Invite with load balancing.

In the system depicted in FIG. 6, load balancing may be performed between multiple bridges 24, 25 by a Domain Name System (DNS) server 51. The bridges 24, 25 are each uniquely identified by a domain name that is registered with the DNS Server 51. The multi-bridge system is setup with two or more possible routes within DNS server 51 for sip.serviceprovider.com. In the present example 53, the primary route may be sip1.serviceprovider.com (IP is 10.72.196.100 assigned to SBC in Data Center 1), and backup may be sip2.serviceprovider.com (10.28.162.100 in Data Center 2).

In this case, user dials 1234@sip.serviceprovider.com (step 601) and the DNS Server 51 tries to resolve sip.serviceprovider.com (step 602). The DNS server 51 returns dialed number (in To: SIP URI) "1234" (step 603) and a corresponding SIP INVITE is sent toward bridge 215 (steps 604 to 606). When bridge 24 app server does lookup of DNIS, it sees that DNIS is assigned to bridge 24 and 200 OKs the INVITE (steps 607 to 609). RTP is setup between UA and bridge 24 (via SBC 28) (step 610).

If the SIP INVITE to the primary bridge 24 gets no response within a configurable and pre-set time limit, the UA 22 would then send the SIP INVITE to backup bridge 25 via SBC 48.

Various load balancing strategies may be employed. For example, the DNS server 51 could be set so that the two priorities for the two entries are the same and/or a bridge could be chosen based on various current or historical usage criteria. Additional entries for other connected sites could also be include. These may include, without limitation: Language Requirements, maintenance or other administration requirements, hot-standby/failover or load-balancing, or historical usage patterns.

The components of the system may be embodied in hardware, software, firmware or a combination of hardware, software and/or firmware. In a hardware embodiment, administration module may be executed on one or more processors operatively associated with one or more memories. The memory may store instructions that are executable on the processor to perform the methods and techniques described herein.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A network, comprising:
   a plurality of audio conferencing systems, each audio conferencing system comprising:
      an audio conferencing bridge configured to provide a conference call to the audio conferencing bridge; and
      a bridge interface layer;
   at least one internet softphone configured to connect to conference calls hosted by the audio conferencing bridge; and
   a DNS Server configured to:
      receive a DNS lookup request from the at least one internet softphone;
      return a list of one or more of the audio conferencing systems; and
      generate the list in accordance with one or more priorities for the plurality of audio conferencing systems;
   wherein the audio conferencing bridge is chosen based on current usage criteria;
   wherein the at least one internet softphone is configured to:
      receive the list of one or more of the audio conferencing systems;
      provide a SIP Invite to the bridge interface layer of a first of the audio conferencing systems in the list;
      provide the SIP Invite bridge interface layer of a second of the audio conferencing systems in the list, is the SIP Invite does not generate a connection to the audio conferencing bridge of the first audio conferencing system; and
      select an audio conferencing system in accordance with the one or more priorities.

2. The network of claim 1, wherein the DNS Server is configured to generate the list in accordance with a load balancing criteria and with a priority for the plurality of audio conferencing systems.

3. The network of claim 1 wherein the DNS Server is configured to generate the list in accordance with one or more pre-set criteria.

4. The network of claim 1 wherein the DNS Server is configured to generate the list in accordance with one or more load balancing criteria.

5. The audio conferencing network of claim 1 wherein the at least one internet softphone is configured to process successive entries of the list until a respective SIP Invite to an audio conferencing system generates a successful connection.

6. The audio conferencing network of claim 1 wherein the at least one internet softphone is configured to receive a SIP Redirect message from an audio conferencing system and to redirect the SIP Invite to an audio conferencing system indicated in the SIP Redirect message.

7. A method, comprising:
   providing a DNS lookup request from the internet softphone to a DNS Server;
   receiving the list of one or more of the audio conferencing systems from the DNS server; and
   providing a SIP Invite to a bridge interface layer of a first of the audio conferencing systems in the list;
   wherein an audio conferencing bridge is chosen based on current usage criteria;
   wherein the audio conferencing systems are configured to provide a conference call to the audio conferencing bridge;
   wherein the bridge interface layer is configured to allow the internet softphones to connect to conference calls hosted by the audio conferencing bridge;
   providing the SIP Invite to the bridge interface layer of a second of the audio conferencing systems in the list, if the SIP Invite does not generate a connection to the audio conferencing bridge of the first audio conferencing system;
   generating the list in the DNS server in accordance with one or more priorities for the plurality of audio conferencing systems; and
   selecting an audio conferencing system in the internet softphone in accordance with the one or more priorities.

8. The method of claim 7 comprising generating the list in accordance with a load balancing criteria and with a priority for the plurality of audio conferencing systems.

9. The method of claim 7 comprising generating the list in the DNS server in accordance with one or more pre-set criteria.

10. The method of claim 7 comprising generating the list in the DNS server in accordance with one or more load balancing criteria.

11. The method of claim 7 comprising processing successive entries of the list in the internet softphone until a respective SIP Invite to an audio conferencing system generates a successful connection.

12. The method of claim 7 comprising receiving a SIP Redirect message from an audio conferencing system into the internet softphone and redirecting the SIP Invite to an audio conferencing system indicated in the SIP Redirect message.

13. A non-transitory computer-readable storage medium comprising instructions for:
   receiving a DNS lookup request in a DNS Server from an internet softphone;
   providing a list of audio conferencing systems to the internet softphone;
   receiving a SIP Invite at a bridge interface layer of a first of the audio conferencing systems in the list;
   wherein an audio conferencing bridge of each of the audio conferencing systems is chosen based on current usage criteria;
   wherein the audio conferencing systems are configured to provide a conference call to the audio conferencing bridge;

wherein the bridge interface layer is configured to allow the internet softphone to connect to conference calls hosted by the audio conferencing bridge; and providing the SIP Invite to the bridge interface layer of a second of the audio conferencing systems in the list, if the SIP Invite does not generate a connection to the audio conferencing bridge of the first audio conferencing system;

generating the list in the DNS server in accordance with one or more priorities for the plurality of audio conferencing systems; and selecting an audio conferencing system in the internet softphone in accordance with the one or more priorities.

14. The non-transitory computer-readable storage medium of claim 13 comprising instructions for generating the list in the DNS server in accordance with one or more pre-set criteria.

15. The non-transitory computer-readable storage medium of claim 13 comprising instructions for generating the list of audio conferencing systems based on the request in accordance with one or more load balancing criteria and with a priority for the plurality of audio conferencing systems.

* * * * *